Oct. 23, 1951  R. F. GLORE ET AL  2,572,611
INTERNAL PIPE CUTTER
Filed Aug. 27, 1947
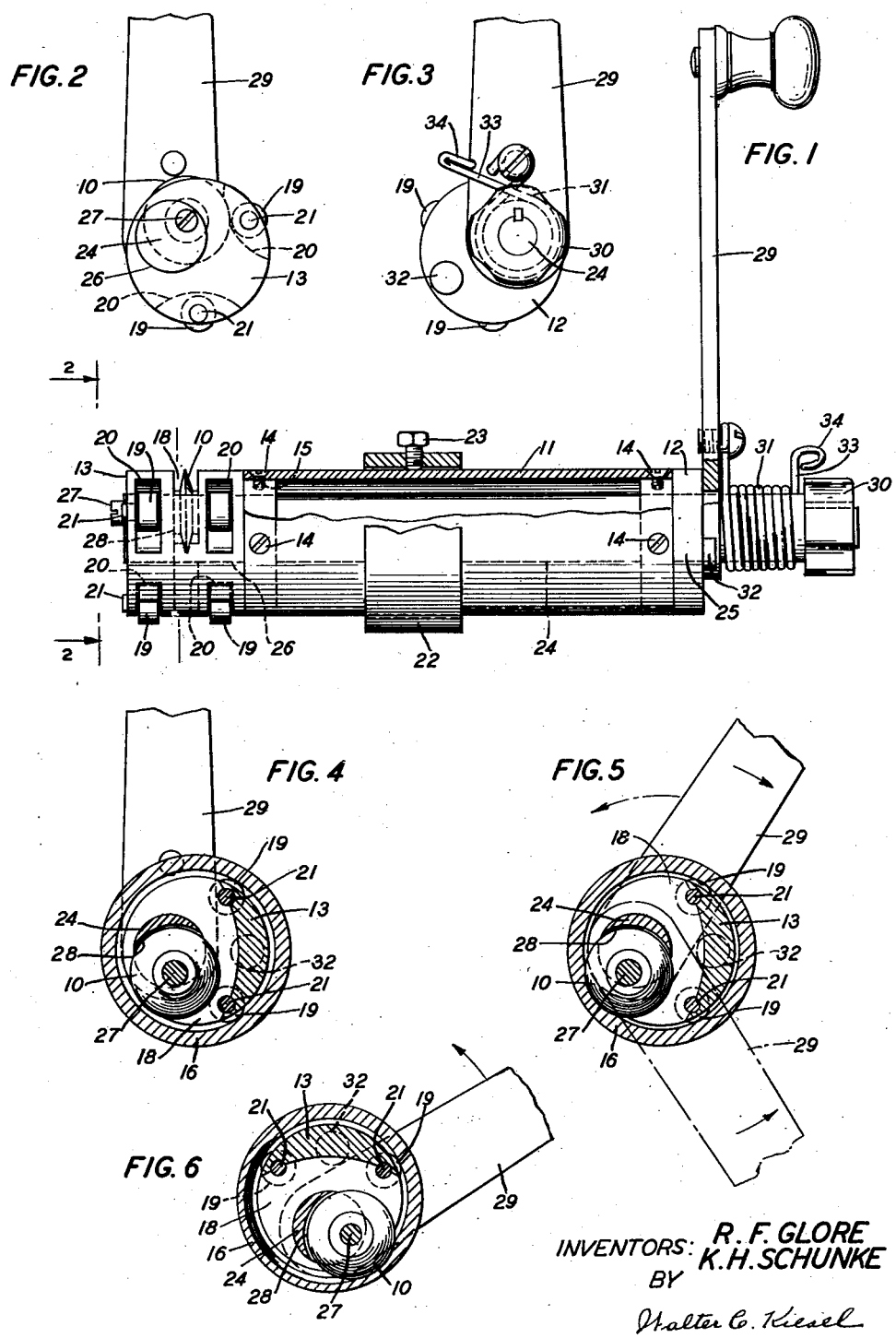
INVENTORS: R. F. GLORE
K. H. SCHUNKE
BY
Walter C. Kiesel
ATTORNEY Patented Oct. 23, 1951

2,572,611

UNITED STATES PATENT OFFICE 2,572,611

INTERNAL PIPE CUTTER

Robert F. Glore, Scotch Plains, and Karl H. Schunke, North Plainfield, N. J., assignors to Bell Telephone Laboratories, Incorporated, New York, N. Y., a corporation of New York Application August 27, 1947, Serial No. 770,918

1 Claim. (Cl. 30—104)

This invention relates to pipe cutters and particularly to internal cutters which effect the cutting operation with the cutting portion of the tool inserted in the open end of a pipe.

An object of this invention is to improve that type of tool which effects the cutting of a pipe by an operation in which the cutting portion thereof is wholly within said pipe.

A further object is to enable the operator to easily adjust the radial extension of the cutter of this tool.

The tool of this invention comprises a rotatable body having an off-center bore in which is journaled a spindle. The body is slotted transversely on its cutting end, the slot being on the side of the body containing the bore and extending into the body sufficiently to allow the spindle having a cutter wheel mounted eccentrically thereon and extending therefrom to be rotated through a complete revolution. This eccentric arrangement of the cutter wheel enables it to be extended from and retracted into the slot by a rotation of the spindle. The cutting operation is thus effected by extending the cutter wheel from within the slot and maintaining it in the extended position while the tool as a whole is rotated within the pipe.

A further understanding of this invention may be obtained from the following detailed description in conjunction with the drawings in which:

Fig. 1 is an elevational view of one side of the pipe cutter of this invention, a portion thereof being shown broken away;

Fig. 2 is an elevational view of the inner or cutting end of the tool taken on the line 2—2 of Fig. 1;

Fig. 3 is an elevational view of the opposite end of the tool;

Fig. 4 is a typical section of the tool taken on the line A—A of Fig. 1 with the cutter wheel retracted and the tool positioned inside of a pipe;

Fig. 5 is a similar section showing the cutter wheel moved into a cutting position;

Fig. 6 is the same section showing the tool in a further cutting position.

Referring to the drawings and particularly to Fig. 1, the cutter wheel 10 is carried within a rotatable cylindrical body comprising a sleeve 11 having end members 12 and 13, both having portions external of the sleeve and flush with the outer surface thereof. These end members are secured by screws 14 passing through countersunk holes in the overlapping edges of the sleeve 11 and into registering holes 15 tapped in the portion of the end pieces of reduced diameter which are rabbeted into the sleeve.

Lying in a transverse slot 18 in the end member 13 is the cutter wheel 10 forming one of three anti-friction suspension points supporting the innermost end of the cutter within the pipe 16, the other two points being in the form of paired anti-friction rollers 19 also mounted in transverse slots 20 on axles 21 lying parallel to the axis of the tool body. The outer end of the tool is supported in cutting position by the outer portion of the body in conjunction with an adjustable collar 22 mounted thereon which is secured in the desired position by a set screw 23. This collar maintains the cutter at the proper depth within the pipe during the cutting operation by preventing longitudinal variations along the pipe as long as the innermost edge of the collar is made to bear on the end of the pipe.

A shaft or spindle 24 is journaled in aligned eccentrically-disposed bearings 25 and 26 in the end members 12 and 13 respectively. The cutter wheel 10 is revolvably carried on an axle 27 which is mounted eccentrically in the spindle parallel to its axis so that a major portion of the wheel is enclosed in a transverse slot 28 cut partially through the spindle 24, said slot having an arcuate bottom to accommodate the circumference of the cutting wheel while maintaining a maximum cross-section and hence maximum strength. The spindle slot 28 carrying the cutter wheel 10 and the slot 18 in end member 13 are longitudinally aligned, and the slot 18 is of such a depth that the portion of the cutter wheel 10 projecting from the spindle 24 clears the bottom of the slot through a complete revolution of said spindle relative to the body.

The spindle 24 is of such length as to have a portion projecting sufficiently from end member 12 of the body to carry a freely rotatable crank handle 29 juxtaposed to the body, an adjusting knob 30 keyed to the spindle at its end, and a unidirectional spring clutch 31 suitably secured to the crank handle at one end and interposed between it and the knob so as to operatively connect the spindle and the crank handle when it is rotated in a clockwise direction as viewed from the outer end of the tool.

Carried on the end member 12 of the body of the tool is a stop 32 which limits the rotation of the crank handle 29 relative to the body to less than one complete turn so that when the stop 32 is reached by the crank 29, as shown in alternative position of Fig. 5 and Fig. 6, a further rotation causes the whole tool to revolve. The spindle 24 is adjustable relative to the crank handle 29 through the clutch 31 which prevents counter-clockwise rotation of the spindle relative to the handle yet permits the spindle to be moved by the clockwise rotation of the knob 30 relative to the handle, the clutch 31 allowing the spindle to slip relative to the handle in this direction.

To cut with this tool, the crank handle 29 is turned against the stop 32, this being its extreme clockwise position relative to the tool body, and the tool as a whole is rotated in a similar direction by the continued application of the clockwise moment on the crank handle. When the cutting wheel projects far enough from the slot 18 to engage the interior of the pipe the clockwise moment exerted on the spindle through the crank handle is opposed by a counter-clockwise moment transmitted from the point of engagement of the cutting wheel with the pipe wall through the wheel to the spindle; thus, the spindle tends to be rotated in a counter-clockwise direction relative to the handle. When cutting, any such rotation is prevented by the operation of the clutch since the torque thus produced tightens the turns of the clutch around the spindle.

In the following description it is to be understood that the tool is to be viewed from the operating or crank end. Figs. 4, 5 and 6 are taken from the cutter end and therefore all directions of rotation shown in these figures will be the reverse of those set forth in the description.

In operation, the tool is inserted with the elements positioned as shown in Fig. 4, that is, with the crank handle 29 turned counter-clockwise from the limit stop 32 and the spindle 24 so positioned relative to the crank handle that the cutter wheel 10 lies wholly within the slot 18 at the end of the body. A clockwise turning of the handle engages the clutch 31 and rotates the spindle relative to the body. As the spindle is rotated the cutter wheel is extended from the slot 18 and engages the wall of the pipe 16 slightly before the crank handle reaches the stop 32. A further turning of the handle first causes the wheel 10 to be forced a short distance into the inner wall of the pipe 16 and then, when the handle has engaged the stop 32 and further extension of the cutter wheel is prevented, rotates the tool as a whole, thus rolling the wheel 10 around the inner surface of the pipe to produce a cut as shown in Fig. 6. Thus it is seen that the cutting engagement of the cutter wheel with the material of the pipe is controlled by the limit stop 32 cooperating with the crank handle.

In the event that the spindle is advanced too far in a clockwise direction relative to the crank handle, the cutter wheel may take too deep a bite into the wall of the pipe when the crank handle is turned clockwise to the limit stop 32 and it may be difficult for the operator to effect any rotation of the tool within the pipe. To relieve this difficulty, it is necessary to turn the spindle in a counter-clockwise direction relative to the crank handle thereby reducing the depth of the cutter in the pipe wall when the crank handle is against the limit stop 32. This is accomplished by providing the clutch 31 with a release means comprising a lever 33 which extends from the outer turn of the spring clutch tangential to the spindle and is provided at its end with a loop 34 forming a surface on which pressure tending to unwind the turns of the clutch may conveniently be applied. When the operator finds that he has taken too deep a bite he can readily reduce its depth by exerting simultaneous clockwise forces on the lever 33 and the crank handle 29. The force on the lever loosens the turns of the clutch 31 from the spindle 24 thus releasing it from the crank handle. Since the cutter has engaged the pipe wall and thereby exerts a counter-clockwise moment on the spindle opposing the clockwise moment exerted on the crank handle, the loosened clutch permits slipping of the crank handle in a clockwise direction on the spindle. The pressure of the crank handle on the limit stop 32 also turns the body of the tool clockwise, hence the spindle has been advanced counter-clockwise in the body and on the crank handle and the cutter has been retracted into the cutting slot. Thus by a limited turning of the tool independent of its spindle, as set forth above, the radial extension of the cutter may be reduced to such a degree that cutting of the pipe can be effected with a reasonable expenditure of force.

In order to increase the radial extension of the cutting wheel after the tool has been rotated through a complete cutting revolution the spindle must be rotated clockwise on the crank handle. To do this the handle is turned in a counter-clockwise direction. In this direction of rotation only a limited frictional engagement is maintained between the spindle 24 and the crank handle 29 by the clutch 31, hence the spindle is turned within the bearings 25 and 26 until the cutting wheel 10 extends from the opposite side of the body slot 18 and engages the wall of the pipe 16 as indicated in Fig. 5, at which point any further turning causes the spindle 24 to slip relative to the crank handle 29 through the clutch connection and thus produces a clockwise advancement of the spindle on the crank handle. The crank handle 29 is then returned in a clockwise direction to the stop 32, the advancement of the spindle 24 having produced a radial extension of the cutter wheel 10 from the slot 18 greater than the corresponding extension during the preceding cut. A deeper cut may thus be taken in the pipe on a further clockwise rotation of the crank handle 29. The above cycle is repeated until the pipe 16 is severed when the crank handle may be turned in a counter-clockwise direction to a position where the cutter wheel is retraced within the slot 18 at which point the tool may be withdrawn from the severed section.

From the above it is seen that the tool herein disclosed provides a simple and efficient means of severing pipes by an internal operation.

While the above form of our invention is preferred at present it will be understood that we do not limit ourselves to this specific disclosure and various changes may be made by those skilled in the art, without departing from the spirit of our invention as claimed.

What is claimed is:

A pipe cutting tool comprising a spindle having a tranverse slot in one end thereof; a cutting wheel mounted eccentric to the axis of the spindle and partially within said slot, a sleeve, members secured at each end of said sleeve; said members having eccentrically disposed means serving as bearings for said spindle, anti-friction supporting means carried on the periphery of the end member associated with said cutting wheel, an adjustable collar on said sleeve adapted to limit the depth of insertion of said cutting wheel, a crank handle mounted for free rotation on the unslotted end of said spindle, a helical spring embracing a portion of said spindle, one end of said spring being secured to said crank handle, a free end of said spring extending away from said spindle whereby said spindle can be released by said spring for free rotation relative to said crank handle, a knob keyed on the unslotted end of said spindle whereby the rotative position of said spindle can be adjusted relative to said crank handle, and a stop on said end member juxtaposed to said crank handle and cooperating therewith for limiting the relative rotation between said sleeve and said spindle and controlling the cutting engagement of said cutting wheel with the material of the pipe.

ROBERT F. GLORE.
KARL H. SCHUNKE.

REFERENCES CITED

The following references are of record in the file of this patent:

UNITED STATES PATENTS

| Number | Name | Date |
|---|---|---|
| 62,859 | Lavery | Mar. 12, 1867 |
| 135,484 | Manuel | Feb. 4, 1873 |
| 255,957 | English | Apr. 4, 1882 |
| 386,205 | Locke | July 17, 1888 |
| 566,668 | Davis | Aug. 25, 1896 |